United States Patent [19]

Wood

[11] Patent Number: 5,046,622

[45] Date of Patent: Sep. 10, 1991

[54] UMBRELLA HOLDER

[76] Inventor: Norman S. Wood, 934 du Pre' Cir., St. Peters, Mo. 63376

[21] Appl. No.: 637,269

[22] Filed: Jan. 3, 1991

[51] Int. Cl.5 ............................................. A47G 25/12
[52] U.S. Cl. ..................................... 211/63; 224/915; 248/309.1
[58] Field of Search ............................ 248/309.1, 315; 224/915, 273, 42.45 R; 296/37.12, 37.13; 211/62, 63

[56] References Cited

U.S. PATENT DOCUMENTS

| | | |
|---|---|---|
| 732,022 | 6/1903 | Young . |
| 1,665,590 | 4/1928 | Hirtz .................................. 211/63 |
| 1,670,962 | 5/1928 | Hall . |
| 1,892,602 | 12/1932 | Beehler ........................... 211/63 X |
| 1,955,436 | 4/1934 | Mott .................................. 135/13 |
| 3,124,287 | 5/1961 | Belzer ................................. 224/29 |
| 3,273,769 | 9/1966 | Miller .......................... 224/42.45 R |
| 3,526,238 | 9/1970 | Brayton ................................ 135/33 |
| 3,794,181 | 2/1974 | Canham ............................... 211/65 |
| 4,009,854 | 3/1977 | Moyer ............................ 211/63 X |
| 4,375,268 | 3/1983 | Speck ......................... 224/42.45 R |
| 4,378,888 | 4/1983 | Reed ................................. 296/37.13 |
| 4,723,748 | 2/1988 | McCarty ........................ 224/915 X |
| 4,795,067 | 1/1989 | Hamilton ....................... 224/915 X |
| 4,948,022 | 8/1990 | Van Dyke ..................... 224/273 X |

Primary Examiner—J. Franklin Foss
Attorney, Agent, or Firm—Grace J. Fishel

[57] ABSTRACT

A one-piece umbrella holder for a collapsed umbrella formed as a tubular member with first and second ends. The ends of the tubular member are structured to hold the collapsed umbrella loosely enough so that a user can push it through the ends but tightly enough so that it does not jar loose in ordinary use whether mounted horizontally, vertically or at an angle. The tubular member is open between the ends with a strip connecting the ends.

8 Claims, 2 Drawing Sheets

UMBRELLA HOLDER

The present invention relates to a one-piece umbrella holder for a collapsed umbrella particularly adapted for use in vehicles but useful in other environments.

BACKGROUND OF THE INVENTION

It is common practice to carry an umbrella in an automobile for use in getting from the car to a building during a rain storm. Typically umbrellas are stashed under the driver's seat or in the back window. In the back window, they act as dangerous projectiles in the event of a head-on crash and, under the front seat, they tend to roll onto the floor where in the front seat, they get under the pedals and in the back, they are stepped on. Some people store their umbrellas on the seats (where they have to be moved or be sat upon) or in the trunk (where they are relatively unavailable when they are needed). Often, the user does not put his umbrella in the same place each time and between uses he may forget where he put it the last time, leading to a frustrating search when the umbrella is needed.

Inventors through the years have responded to the need for an effective umbrella holder particularly adapted for use in an automobile or other vehicle. The patent literature is full of patented constructions, many of which include means for draining a wet umbrella in the holder. This seems pointless because people usually dry their umbrellas in their homes, offices and so forth after they use the umbrella to get from the car to the building. Apparently, none of the prior art constructions (whether patented or not) are practical since none are in common use today.

In view of the above, there is a continuing need for a practical umbrella holder particularly adapted for use in storing a collapsed umbrella in an automobile or other vehicle.

SUMMARY OF THE INVENTION

A main feature of the present invention is to provide a practical one-piece umbrella holder for storage of a collapsed umbrella when it is not in use. The umbrella holder is a tubular member having first and second ends for holding the collapsed umbrella loosely enough so that a user can push the collapsed umbrella through the ends but tightly enough such that the collapsed umbrella does not jar loose in ordinary use. The tubular member is open between the ends and forms a strip connecting the first and second ends. The strip serves to guide the collapsed umbrella as it is inserted into the holder from the first end towards and through the second end. The opening in the tubular member eases friction on the collapsed umbrella as it is inserted into the holder.

An important object of the present invention is to provide an umbrella holder which is symmetrical and adapted for right and left handed use, can be mounted horizontally, vertically or at an angle and is adapted to fit a majority of umbrellas thus providing the utility and convenience of having an umbrella ready for use, while protecting it from dirt and injury.

Another object of the present invention is to provide an umbrella holder which may be mounted in automobiles, trucks, vans and the like, such that the umbrella is always located safely and securely in the same place but out of the way when not in use. The umbrella holder can be mounted on or under the vehicle's dashboard, on the side panel, on the door post between the front and rear seats and so forth. While the holder is adapted for use in moving vehicles and the like, it is readily apparent that it is also suited for use in theaters, homes, offices and the like.

Other objects and features of the invention will be in part apparent and in part pointed out hereinafter.

The invention accordingly comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings and in which.

DETAILED DESCRIPTION OF THE INVENTION

Figure 1:
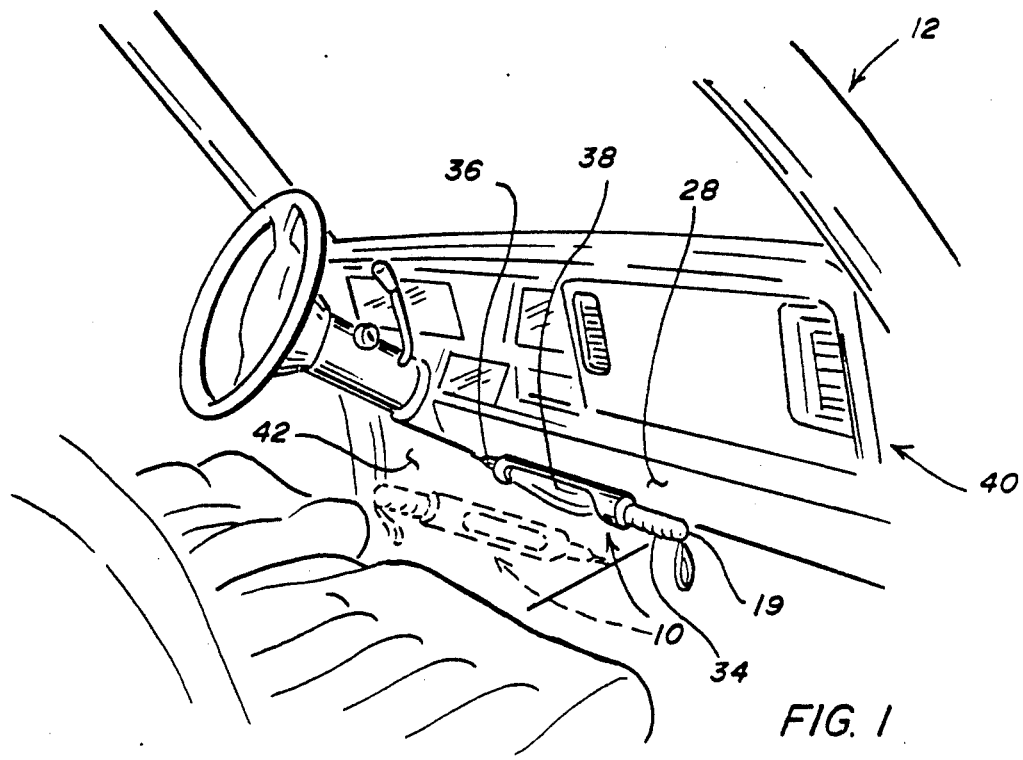
FIG. 1 is a perspective view of an umbrella holder in accordance with the present invention showing the umbrella holder in use in full lines mounted on a dashboard of a vehicle and in dotted lines mounted on a side panel.
Figure 2:
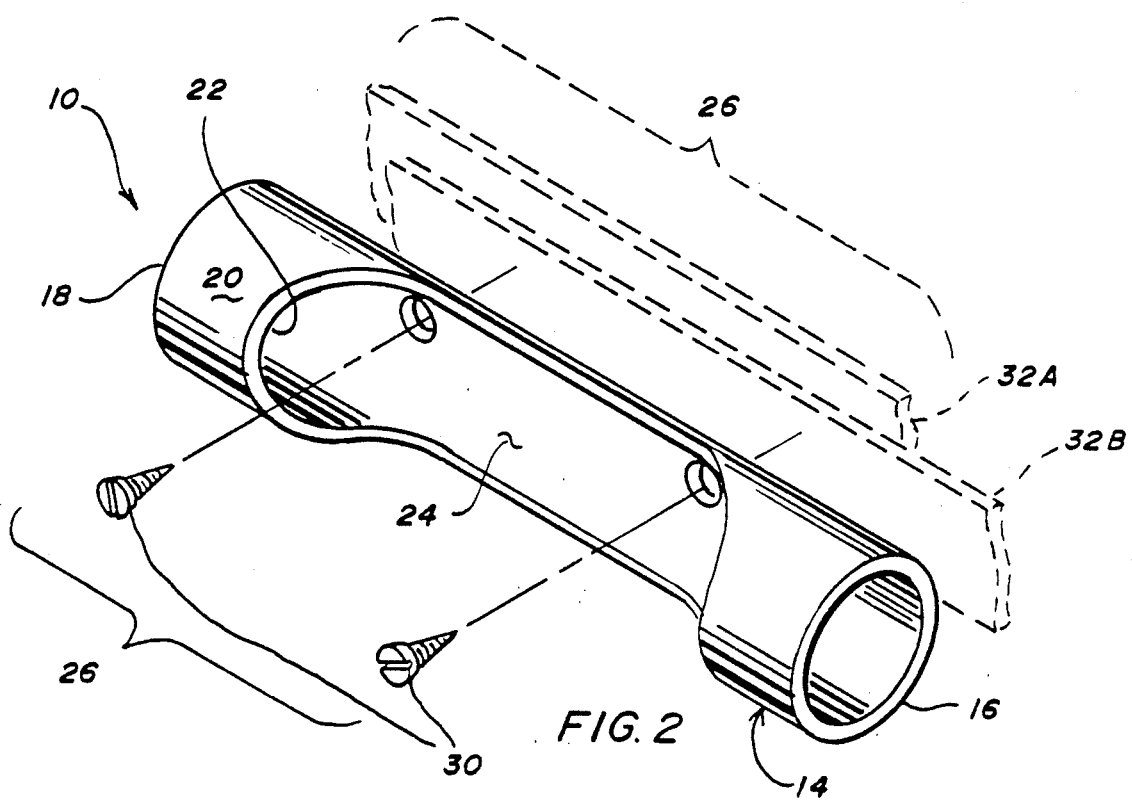
FIG. 2 is an exploded perspective view of the umbrella holder shown in FIG. 1 with one means of mounting shown in full lines and an alternative means of mounting shown in dotted lines.
Figure 3:
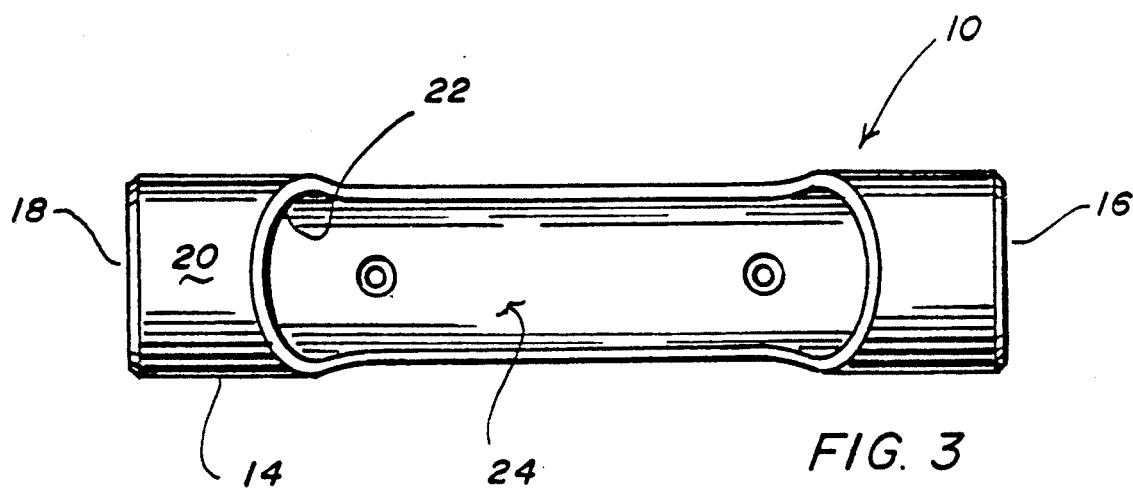
FIG. 3 is a front view of the umbrella holder shown in FIG. 2.
Figure 4:
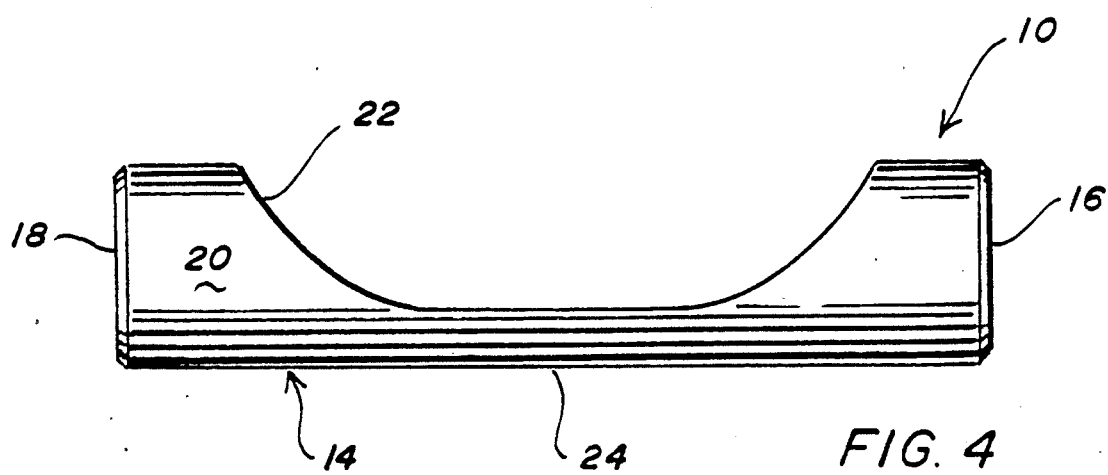
FIG. 4 is a side view of the umbrella holder shown in FIG. 2.
Figure 5:
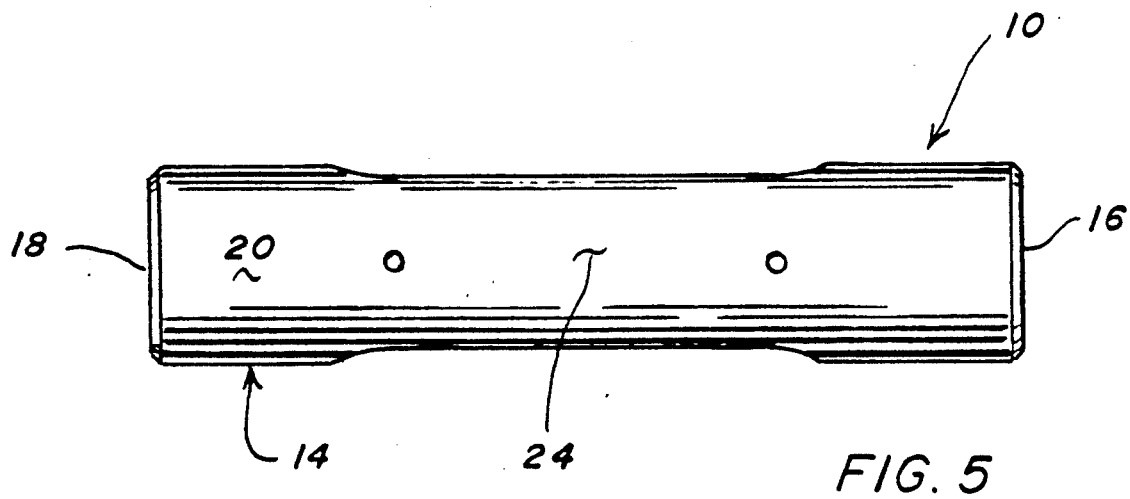
FIG. 5 is a rear view of the umbrella holder shown in FIG. 2.

Referring to the drawings, a one-piece umbrella holder 10 is shown in FIG. 1 in use in an automobile 12. With continuing reference to the drawings and in particular to FIG. 2, one-piece umbrella holder 10 comprises a tubular member 14 having a first end 16 and a second end 18 for holding a collapsed umbrella 19 loosely enough so that a user can push the collapsed umbrella 19 through the ends but tightly enough such that the collapse umbrella does not jar loose in ordinary use. Tubular member 14 is shorter than collapsed umbrella 19. As illustrated in the drawings (but not limited thereto), tubular member 14 is formed from a hollow cylindrical member having a sidewall 20 with encircling first and second ends 16 and 18, respectively. An opening 22 is provided in sidewall 20 between said encircling first and second ends 16 and 18, respectively, with the remainder of sidewall 20 forming a strip 24 (illustrated as narrow) connecting the encircling first and second ends 16 and 18, respectively. Strip 24 serves to guide the collapsed umbrella as it is inserted into one-piece umbrella holder 10 from first encircling end 16 towards and through second encircling end 18. Opening 22 eases friction on collapsed umbrella 19 as it is inserted into one-piece umbrella holder 10.

A means 26 for attaching the holder to a supporting surface 28 is provided. As shown in FIG. 2, means 26 for attaching the holder can be screws 30, mating hook and loop fasteners (e.g., VELCRO) 32A and 32B, respectively, adhesive (not shown) and so forth. Screws 30 may take the form of sheet metal screws, self tapping screws or the like depending on the nature of supporting surface 28 as more particularly described below. Hook and loop fasteners 32A and 32B are attached with adhesive or the like to supporting surface 28 and the outer surface of strip 24, respectively. When means 26 for attaching the holder is an adhesive, the adhesive may be provided as a film on the outer surface of strip 24 protected by a cover or sheet (not shown) which is stripped off before the adhesive is pressed firmly to supporting surface 28. Alternatively, the adhesive can be provided as a double sided adhesive tape both sides of which are protected with a cover or sheet (not shown) until ready for use. When the protective cover or sheet is stripped off both sides, the exposed adhesive is pressed firmly to the outer surface of strip 24 and to supporting surface 28.

One-piece umbrella holder 10 can be used with an ordinary or a folding collapsed umbrella 19. An ordinary collapsed umbrella 19 includes a handle 34 attached to a stem (not shown). Handle 34 is usually (but not always) permanently attached to the stem and may be of any desired shape, e.g. curved, straight or whimsical such as a duck head or the like. The stem terminate in a tip 36 formed on the opposite end of the stem from handle 34. A body 38 of the umbrella is conventionally formed of cloth or plastic supported by ribs (not shown) hinged at one end of the stem near tip 36. A folding collapsed umbrella 19 (as shown in FIG. 1) is like an ordinary collapsed umbrella 19 except that the stem telescopes and the ribs are hinged mid-length and fold towards tip 36 in collapsed condition. In general a collapsed folding umbrella is shorter than an ordinary umbrella. Hence when collapsed umbrella 19 is an ordinary umbrella, tubular member 14 is preferably longer than when collapsed umbrella 19 is a folding umbrella.

Tubular member 14 may be formed of any suitable material such as plastic or metal and optionally colored to match the upholstery of automobile 12 or body 38 of collapsed umbrella 19.

In use, one-piece umbrella holder 10 is mounted on supporting surface 28 by means 26 for attaching the holder. As shown in FIG. 1, one-piece umbrella holder 10 can be attached horizontally to a dashboard 40, at an angle on a side panel 42 near the floorboards, vertically on the post (not shown) between the front and back seats or the like. When supporting surface 28 is a metal post, screws 30 are the preferred means 26 for attaching the holder but on other supporting surfaces 28 mating hook and loop fasteners 32A and 32B are preferred.

After one-piece umbrella holder 10 is installed on supporting surface 28, tip 36 of collapsed umbrella 19 is insert through first end 16 or second end 18. As body 38 of collapsed umbrella 19 slides through the end at which the tip was inserted, strip 24 guides tip 36 towards and through the other end and opening 22 eases friction on collapsed umbrella 19. It is not necessary to pass handle 34 through first and second ends 16 and 18, respectively, of tubular member 14 hence one-piece umbrella holder 10 fits a majority of umbrellas. Since one-piece umbrella holder 10 is symmetrical, it is adapted for right and left handed use and a collapsed umbrella 19 can be inserted from either end of tubular member 14. After collapsed umbrella 19 is inserted in one-piece umbrella holder 10, the collapsed umbrella 19 is securely held out of the way, always in the same safe place and protected from dirt and injury.

One-piece umbrella holder 10 is illustrated in automobile 12 but it will be apparent that it is adapted for use in a variety of other moving vehicles such as trucks, vans and the like. It will also be apparent that it is suited for use in other environments such as theaters, homes, offices and so forth.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A one-piece umbrella holder that is substantially symmetrical about a plane passing through its midline and functional in any orientation for grasping a collapsed umbrella comprising a tubular member having first and second substantially identical encircling ends, said encircling ends grasping the collapsed umbrella loosely enough so that a user can push the collapsed umbrella through the ends but tightly enough such that the collapsed umbrella does not jar loose in ordinary use, said tubular member open between said ends and forming a strip connecting the first and second encircling ends, said strip serving to guide the collapsed umbrella as it is inserted into the holder from the first end towards and through the second end and said opening in the tubular member easing friction on the collapsed umbrella as it is inserted into the holder.

2. The holder of claim 1 having a means for attaching the holder to a supporting surface.

3. The holder of claim 2 wherein the tubular member is shorter in length than the collapsed umbrella.

4. A one-piece umbrella holder that is substantially symmetrical about a plane passing through its midline and functional in any orientation for grasping a collapsed umbrella comprising a hollow cylindrical member shorter in length than the collapsed umbrella, said hollow cylindrical member having first and second substantially identical encircling ends for holding the collapsed umbrella loosely enough so that a user can push the collapsed umbrella through the encircling ends but tightly enough such that the collapsed umbrella does not jar loose in ordinary use, said hollow cylindrical member open between said encircling ends and forming a narrow strip connecting the first and second encircling ends, said strip serving to guide the collapsed umbrella as it is inserted into the holder from the first encircling end towards and through the second encircling end and said opening in the hollow cylindrical member easing friction on the collapsed umbrella as it is inserted into the holder.

5. The holder of claim 4 wherein the hollow cylindrical member is formed of plastic.

6. The holder of claim 5 having means for attaching the holder to a supporting surface by the narrow strip connecting the first and second encircling ends.

7. The holder of claim 6 wherein the means for attaching the holder are screws.

8. The holder of claim 6 wherein the means for attaching the holder are mating hook and loop fasteners.

* * * * *